(12) United States Patent
Wu et al.

(10) Patent No.: US 7,932,321 B2
(45) Date of Patent: Apr. 26, 2011

(54) FABRICATION METHOD OF A BASIC POLYMER ELECTROLYTE FILM OF BLENDED POLYVINYL ALCOHOL AND QUATERNARY AMINE

(75) Inventors: Gwo-Mei Wu, Tao-Yuan (TW); Chun-Chen Yang, Taishan Shiang (TW); Sheng-Jen Lin, Taipei (TW); Chi-Neng Huang, Taishan Shiang (TW)

(73) Assignee: Chang Gung University, Tao-Yuan (TW)

( * ) Notice: Subject to any disclaimer, the term of this patent is extended or adjusted under 35 U.S.C. 154(b) by 1234 days.

(21) Appl. No.: 11/527,504

(22) Filed: Sep. 27, 2006

(65) Prior Publication Data

US 2007/0105020 A1    May 10, 2007

(30) Foreign Application Priority Data

Nov. 8, 2005   (TW) ................. 94139146 A

(51) Int. Cl.
  *C08F 8/00*   (2006.01)
  *C08K 5/00*   (2006.01)
  *H01M 6/18*   (2006.01)

(52) U.S. Cl. .......... 525/61; 429/305; 429/307; 429/317; 521/25; 523/353; 524/113; 524/155; 524/173; 524/236; 524/361; 524/385; 525/56; 525/379

(58) Field of Classification Search .............. 429/33, 429/305, 307, 317; 521/25; 523/353; 524/113, 524/155, 233, 236, 251, 173, 361, 385; 525/56, 525/61, 379

See application file for complete search history.

(56) References Cited

U.S. PATENT DOCUMENTS 3,069,728 A * 12/1962 Mindick et al. .............. 264/316

* cited by examiner

*Primary Examiner* — David Wu
*Assistant Examiner* — Marie Reddick
(74) *Attorney, Agent, or Firm* — Rosenberg, Klein & Lee

(57) ABSTRACT

The present invention discloses a fabrication method of a basic polymer electrolyte film of blended polyvinyl alcohol and quaternary amine, wherein hydrophilic polyvinyl alcohol and quaternary amine are separately dissolved in a polar organic solvent, and then, the solutions are blended to obtain a glutinous polymeric solution; the glutinous polymeric solution is baked to form a film, and then, the film is soaked in an alkali hydroxide solution to obtain a basic electrolyte-containing solid-state polymer electrolyte film. The basic polymer electrolyte film of the present invention has the characteristics of superior chemical stability, high mechanical strength and high ionic conductivity. When the present invention applies to a zinc-air battery, the utilization rate of zinc is promoted. The basic polymer electrolyte film of the present invention can be widely used in various energy storage systems, such as alkaline battery systems, alkaline fuel cells and capacitors.

18 Claims, 13 Drawing Sheets

FABRICATION METHOD OF A BASIC POLYMER ELECTROLYTE FILM OF BLENDED POLYVINYL ALCOHOL AND QUATERNARY AMINE

BACKGROUND OF THE INVENTION

1. Field of the Invention

The present invention relates to a fabrication method of a basic polyvinyl-alcohol-based polymer electrolyte film, particularly to a fabrication method of a basic polymer electrolyte film of blended polyvinyl alcohol and quaternary amine and its application in electrochemical systems.

2. Description of the Related Art

PVA (polyvinyl alcohol) is a stable, non-toxic granular or powdered material and has a color varying from white to pale-yellow. Microscopically, the structural formula of polymeric PVA is ($-CH_2-CH-OH)_n-$). As PVA has hydrophilic hydroxyl radicals, it is highly compatible with water and potassium hydroxide, which also have hydroxyl radicals, and water is just the most effective and economical solvent. When PVA is not polymerized with other materials, it is a chain-like high polymeric molecule, and the length thereof is measured in the unit of the length of a C—C bond, and the length of the chain depends on the degree of polymerization. PVA molecules cohere with covalent bonds and hydrogen bonds and form an amorphous hypo-crystalline material; besides, the high polymeric molecular chain is rotatable, which makes PVA be a flexible polymeric material. When an electrical potential difference is applied to PVA, the coupling interaction of the PVA backbones will create a temporary coordinate bonding on the metallic ions inside the PVA material, and the polymeric PVA molecular chain will be moved; thus, the metallic ions are conducted.

PVA has a hydrophilic hydroxyl group and a non-polar hydrophobic alkyl-based chain; therefore, PVA has a superior water-absorbency (about 30%) and superior water retention ability. In alkaline batteries, a PVA-containing polymer electrolyte film can absorb a great amount of alkaline electrolytic solution, and thus, the solid-state polymer electrolyte film becomes gel-like; even though it is placed inside the battery for a long time, no leakage will appear; therefore, the storage life of the battery can be prolonged. Further, the film made of PVA has the characteristics of superior adhesiveness, solvent-resistance, abrasion-resistance, oxygen-barrier ability and tensile strength.

A Taiwan Patent publication No. 200583781 provides a fabrication method, wherein PVA, alkali hydroxide and water are copolymerized to form a solid-state polymer electrolyte. Refer to FIG. 1 for the detailed steps of this method. Firstly, 10~20 wt. % of PVA with the average molecular weight of 2,000~120,000 and 50~60 wt. % of water is mixed and agitated to dissolve completely in an airtight environment and at the ambient temperature (Step S111); meanwhile, 15~25 wt. % of alkali hydroxide and 10~20 wt. % of water is mixed and agitated to dissolve completely in an airtight environment and at the ambient temperature (Step S112); next, the PVA solution and the alkali hydroxide solution are mixed at the ambient temperature, and after both are intermixed completely, the intermixed solution is heated in an airtight environment and at the temperature of 50~100° C. so that a polymerization reaction can undertake therein, and then, after the polymerization completed, the whole system is cooled down at the ambient temperature (Step S12); lastly, a glass-fiber cloth is placed on a tray, and the cooled glutinous polymeric solution is evenly applied to the glass-fiber cloth at the operational temperature of 40~80° C. and under the operational humidity of 20-50 RH %, and after 30~60 minutes, a solid-state polymeric film is thus formed (Step S13). However, in the abovementioned conventional technology, when the amount of PVA is too low, or when the amount of alkali hydroxide is too high, or when PVA and alkali hydroxide are added into water simultaneously, the film is hard to form; when the water content of the film is too low, there is an incomplete polymerization reaction so that the ionic conductivity of the solid-state polymeric film will be reduced. When PVA deteriorates, the backbones thereof will break, and the mechanical strength thereof will decrease. To avoid the abovementioned problem, glass-fiber cloth is used to enhance the structure; although the mechanical strength of the solid-state polymeric film is temporarily increased thereby, the deterioration process of PVA still keeps on, and the mechanical strength of PVA itself is not really increased in the long run.

In addition to the abovementioned conventional technology that the solid-state polyelectrolyte film is purely made of PVA, another Taiwan Patent publication No. 200525806 provides a fabrication method of a basic polyelectrolyte film of blended PVA and polyepichlorohydrin (PECH). Refer to FIG. 2 for the steps of this method. Firstly, 1~30 wt. % of PVA with the average molecular weight of 10,000~120,000 and the purity of 80~99% and 70~90 wt. % of DMSO (dimethyl sulfoxide) is intermixed for 60~100 minutes at the temperature of 40-80° C. (Step S211); meanwhile, 1~30 wt. % of PECH with the average molecular weight of 100,000~1,000,000 and the purity of more than 50% and 70~90 wt. % of DMSO (dimethyl sulfoxide) are intermixed for 60~100 minutes at the temperature of 40-80° C. (Step S212); the PVA solution and the PECH solution are mixed and agitated for about 10~15 minutes at the speed of 100~1,500 rpm to blend them completely (Step S22); the completely-blended glutinous polymeric solution is poured on a tray and placed in a thermohydrostat at the temperature of 30-70° C. and under the humidity of 5-30 RH % for 60~180 minutes so that DMSO can vaporize completely (Step S23); lastly, the DMSO-free polymeric film is soaked in the solution of 20~50 wt. % of alkali hydroxide with the purity of more than 85%, and after 1~24 hours, the polymeric film is taken out, and then, the basic polymer electrolyte film of blended PVA and PECH is thus formed (Step S24). In comparison with the solid-state basic polyelectrolyte film purely made of PVA, the solid-state basic polymer electrolyte film fabricated with this method has very tiny pores; therefore, it has superior oxygen-barrier ability, which can retard the reaction between oxygen and electrodes and prolong the life of basic batteries. Besides, similar to PVA, PECH is also highly hydrophilic, and owing to the powerful the hydrogen bonding effect thereof, the blending effect is better; therefore, the mechanical strength of the polymer electrolyte film made of PVA and PECH is higher than that purely made of PVA. However, this conventional technology neither provides a method to really solve the deterioration problem of PVA nor mentions a fabrication method of the polymer electrolyte film of blended PVA and quaternary amine.

In order to effectively solve the deterioration problem of PVA, to enhance the mechanical strength of PVA film, and further to promote the hydrophile and the ionic conductivity of PVA, the present invention proposes a fabrication method of a basic polymer electrolyte film of blended polyvinyl alcohol and quaternary amine, which can be extensively used in various alkaline energy-storage systems.

SUMMARY OF THE INVENTION

The primary objective of the present invention is to provide a fabrication method of a basic polymer electrolyte film of blended polyvinyl alcohol and quaternary amine, wherein the highly hydrophilic PVA (polyvinyl alcohol) and quaternary amine are blended to fabricate a basic polymer electrolyte film, and the basic polymer electrolyte film fabricated thereby has a superior compatibility with the solution of alkali hydroxide, and thus, the polymer electrolyte film of the present invention can absorb alkaline solution as much as 30~50 wt. %.

Another objective of the present invention is to provide a fabrication method of a basic polymer electrolyte film of blended polyvinyl alcohol and quaternary amine, wherein PVA and quaternary amine, which both have a lot of hydrogen bonds, are blended to fabricate a basic polymer electrolyte film; owing to the strongly hydrogen bonding effect thereof, the blending degree is increased, and the mechanical strength of the polyelectrolyte film of the present invention is promoted.

Still another objective of the present invention is to provide a fabrication method of a basic polyelectrolyte film of blended polyvinyl alcohol and quaternary amine, wherein electronegative PVA is blended with electropositive quaternary amine so that the electronegative PVA is no more liable to react with electropositive bacteria, and thus, the deterioration problem of PVA is ultimately solved.

Further another objective of the present invention is to provide a fabrication method of a basic polyelectrolyte film of blended polyvinyl alcohol and quaternary amine, wherein owing to the blending with quaternary amine, the original crystallinity of PVA is reduced; after the coupling interaction between PVA and hydroxides in basic electrolytic solution, ions can move in the polymeric structure more easily, and thus, the ionic conductivity of the polymer electrolyte film of the present invention is promoted.

To achieve the abovementioned objectives, the present invention proposes a fabrication method of a basic polyelectrolyte film of blended polyvinyl alcohol and quaternary amine, wherein PVA and quaternary amine are respectively dissolved in a polar organic solvent, such as DMSO (dimethyl sulfoxide), at a specified temperature for a specified time, and then, under the conditions of optimized temperature, agitation speed and duration, the PVA-containing solution and quaternary amine-containing solution are mixed and agitated to undertake a polymeric blending reaction; according to the thickness required, the blended polymeric solution is poured onto a tray, and the solvent thereof vaporized under the conditions of appropriate temperature, humidity, and duration; lastly, the dried polymeric film is soaked in a alkali hydroxide solution of a specified concentration, and after the polymeric film has absorbed sufficient alkaline solution, it is taken out from the solution, and a basic polymer electrolyte film of blended polyvinyl alcohol and quaternary amine is thus obtained. Thereby, the basic polymer electrolyte film of the present invention has the characteristics of superior chemical stability, high mechanical strength and high ionic conductivity. When the present invention applies to a zinc-air battery, the utilization rate of zinc can be as high as 90%. Further, the basic polymer electrolyte film of the present invention can be widely used in various alkaline energy storage systems.

In certain embodiments, the step of forming said PVA-containing reactant solution includes a temperature range of 40 to 90° C., and a duration range of 40 to 120 minutes; and, the step of forming said quaternary amine-containing reactant solution includes a temperature range of 30 to 80° C., and a duration range of 30 to 100 minutes. Depending on the embodiment, the step of forming the solution of the product of the polymeric blending reaction includes a blending agitation speed range of 300 to 2,000 rpm. The step of forming the solution of the product of the polymeric blending reaction may further include a temperature range of 30 to 90° C., and a duration range of 10 to 20 minutes. The step of allowing the polar organic solvent to vaporize completely in certain embodiments includes a temperature range of 40 to 70° C., and a duration range of 30 to 1,800 minutes. The step of allowing said polar organic solvent to vaporize completely may further include a humidity range of 5 to 50 RH %.

In certain embodiments, the polyvinyl alcohol is at least 80% saponified. The quaternary amine may be selected from the group consisting of 1,4-diazabicycle [2.2.2] octane, triethyl amine, and tetraethyl amine. Depending on the embodiment, the polar organic solvent may be selected from the group consisting of dimethyl sulfoxide, dimethyl formamide, tetrahydrofuran, methyl ethyl ketone, acetone, methanol and isopropyl alcohol. The polar organic solvent in certain embodiments is dimethyl sulfoxide, having weight ranges from 10 to 90 wt. % in the PVA-containing and quaternary amine-containing reactant solutions.

Depending on the embodiment, the tray employed may be a culture dish or a glass plate or a polytetrafluoroethylene plate. The alkali-hydroxide solution may be an amine hydroxide and selected from the group consisting of quaternary amine hydroxide solution, tertiary amine hydroxide solution, and tetramethyl ammonium hydroxide solution. The thickness of the network polymeric film may range from 5 to 5,000 μm.

To enable the objectives, technical contents, characteristics and accomplishments of the present invention to be more easily understood, the embodiments of the present invention are to be described below in detail in cooperation with the attached drawings.

DETAILED DESCRIPTION OF THE INVENTION

Figure 1:
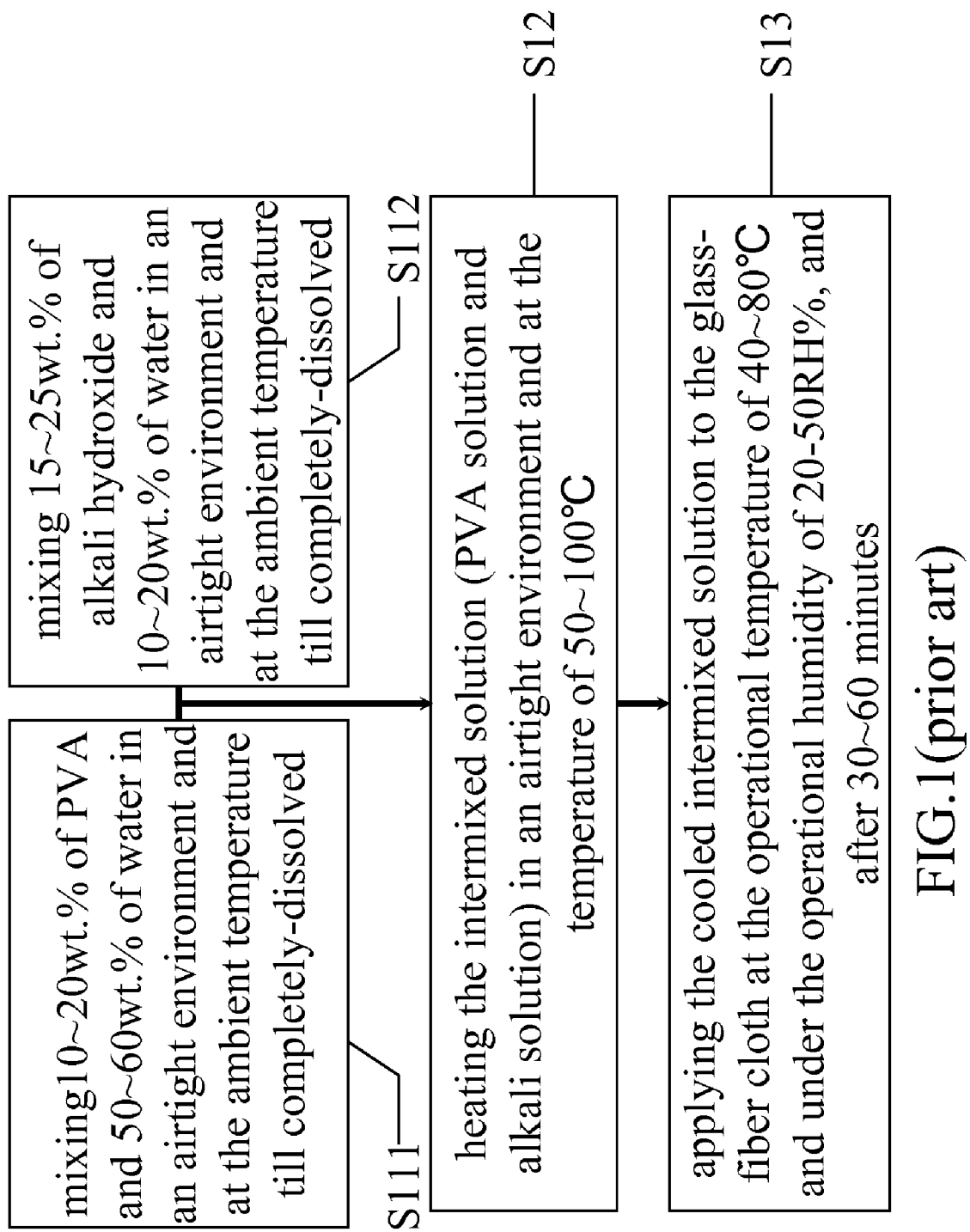
FIG. 1 is a flowchart of a conventional fabrication method of a polymeric film.
Figure 2:
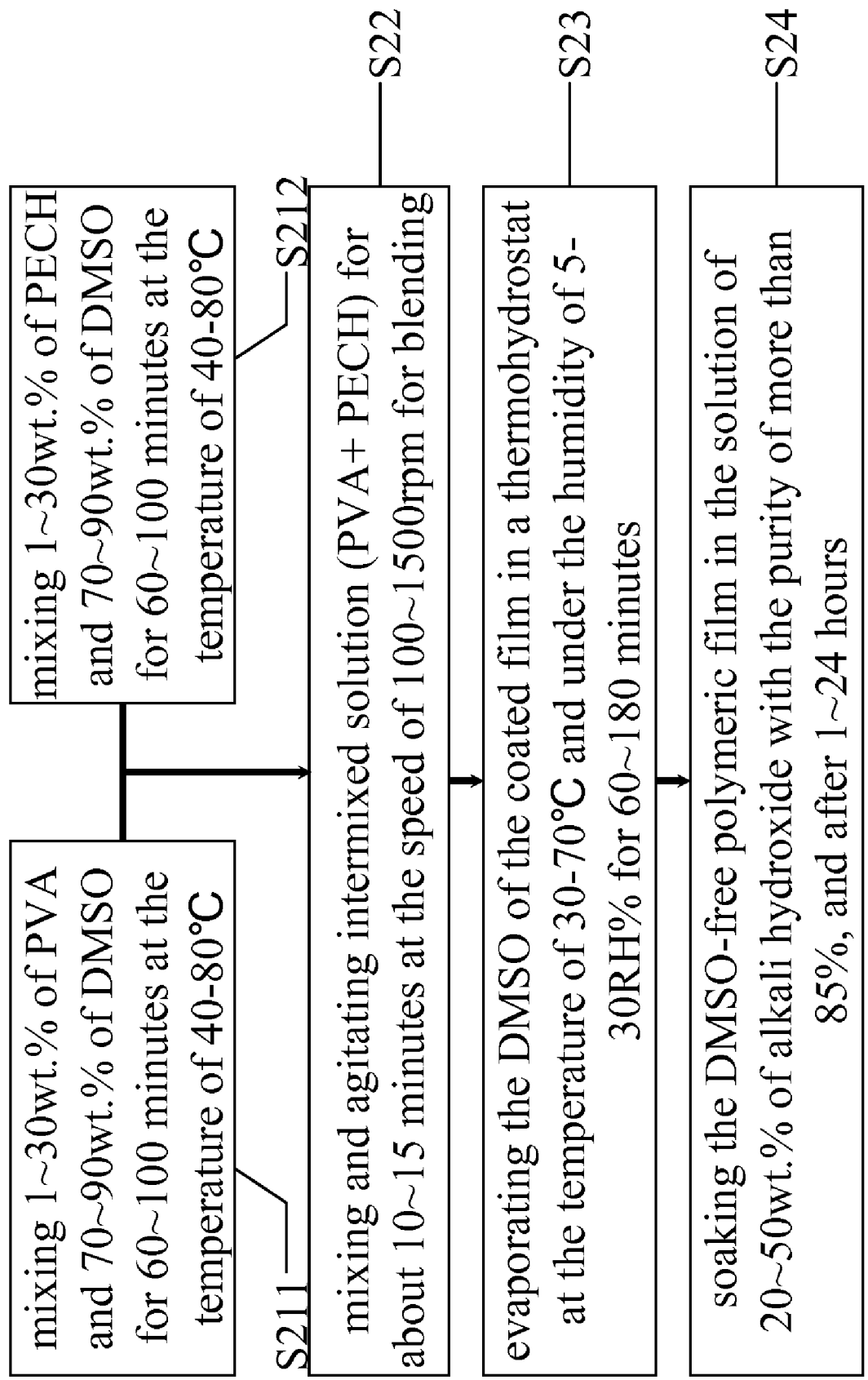
FIG. 2 is a flowchart of another conventional fabrication method of a polymeric film.
Figure 3:
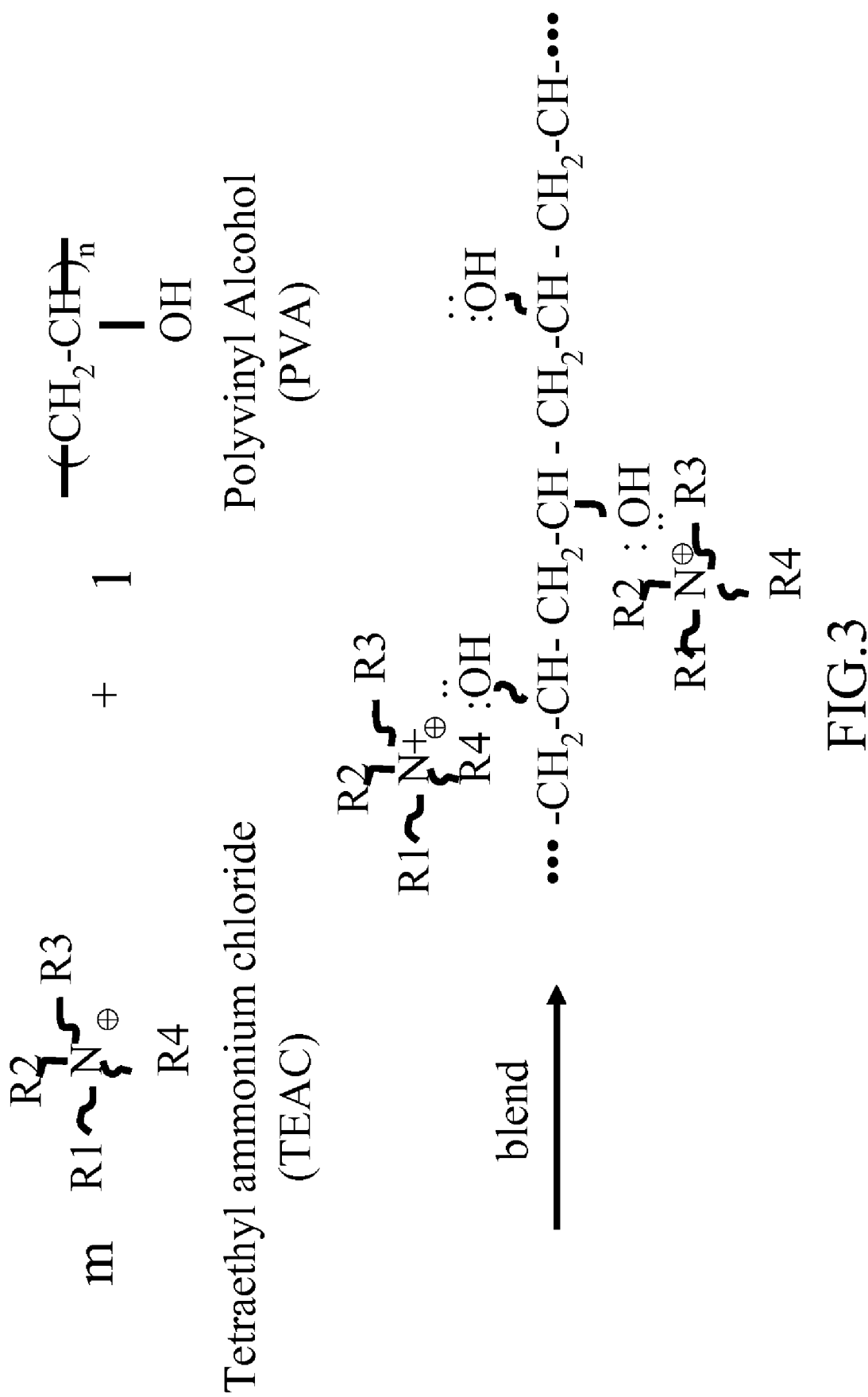
FIG. 3 is a diagram schematically showing the reaction mechanism of blended PVA and quaternary amine.

In the present invention, the product of the blending reaction of PVA and quaternary amine is used as the material of a polymer electrolyte film. Refer to FIG. 3 for the mechanism of the blending reaction between PVA and quaternary amine. The structure of PVA monomer is —$(CH_2—CH—OH)_n$—, and the structure of quaternary amine is formed via connecting four carbon-chain structures—R1, R2, R3 and R4—to a nitrogen atom, wherein those four carbon-chain structures R1, R2, R3 and R4 may be identical or different. In the blending reaction, 1 mole of PVA reacts with m mole of quaternary amine, wherein electropositive quaternary amine is attracted by the electronegative PVA. Besides, both PVA and quaternary amine have a lot of hydrogen bonds; therefore, after the blending reaction, the product is a polymer of high structural strength and high chemical stability. Further, owing to the addition of quaternary amine, the crystallinity of PVA is reduced, and the barrier to the ion mobility in the polymer electrolyte film is decreased, and thus, the ionic conductivity is promoted. However, it is to be noted that the ratio of reactants and the sequence of adding reactants directly influence the result of the film-forming process of the polymeric film. For example, if the weight ratio of PVA is too high, it is hard to dissolve completely, and the ionic conductivity of the polymeric film will be reduced; if the weight ratio of PVA is too low, the film forming process will become much more difficult; when PVA and quaternary amine are added into solvent simultaneously, the polymeric molecular chains of PVA cannot completely expand in the solvent because hydrogen bonds have formed between a portion of PVA and quaternary amine or because the attractive force between electronegative PVA and electropositive quaternary amine results in structural interlinking; in this case, the incapability of expanding molecular chains will influence the original characteristics of the polymeric film, and its quality will become worse, or even the film cannot be formed due to the failure film forming process.

In the embodiment, the present invention proposes a fabrication method of a basic polymer electrolyte film of blended polyvinyl alcohol and quaternary amine; firstly the raw materials are described below:

PVA (polyvinyl alcohol): having the average molecular weight of 20,000~90,000 and the purity of 50-99%, wherein either granular or powdered PVA can be the reactant therein;

TEAC (tetraethyl ammonium chloride): having the molecular weight of 165.7 and the purity of 50-99.99%, wherein either granular or powdered TEAC can be the reactant therein; and DMSO (dimethyl sulfoxide): having the boiling point of 189° C. and the purity of 90-99%, wherein only liquid DMSO solvent can be used in the reaction.

Figure 4:
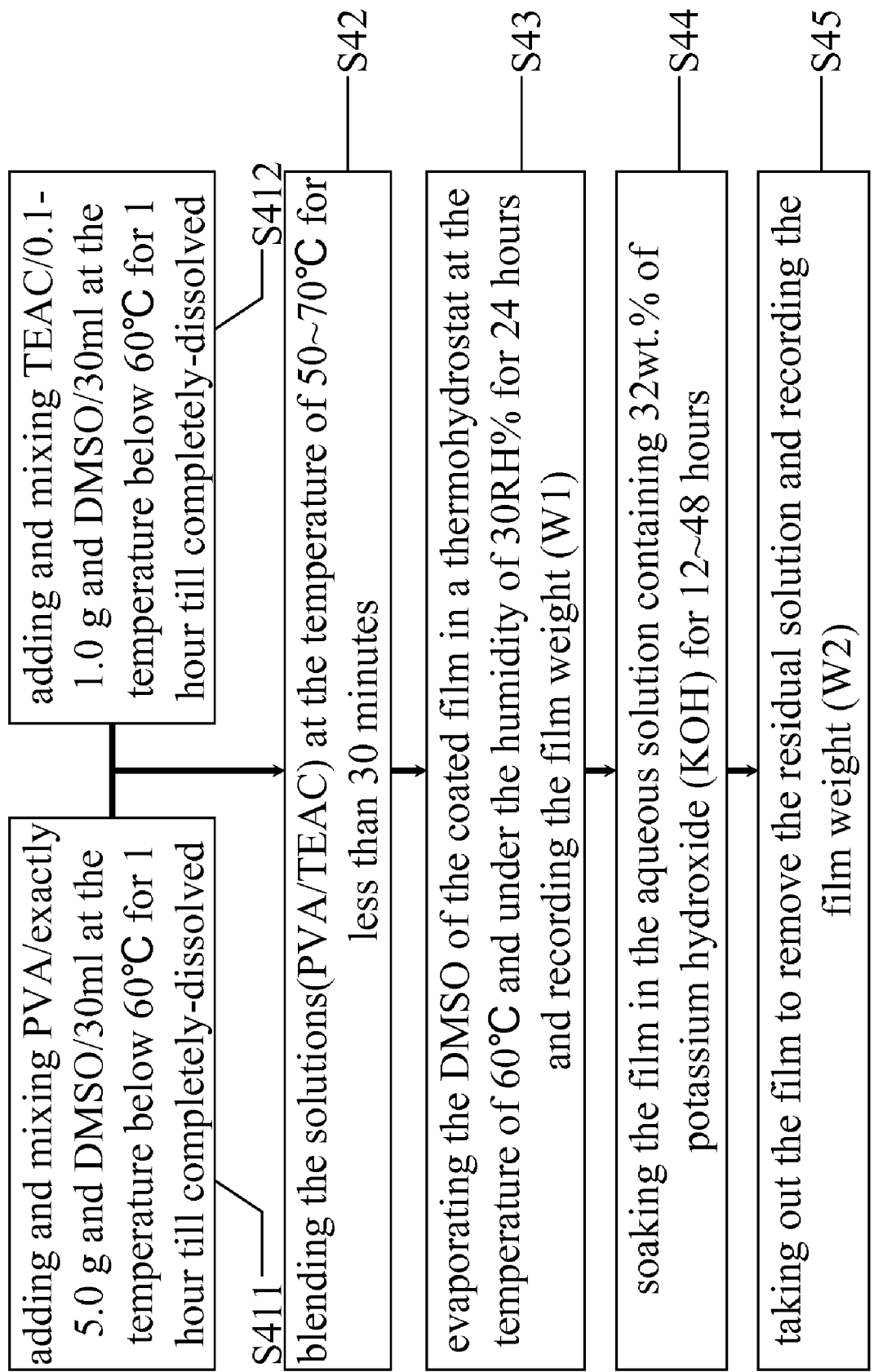
FIG. 4 is a flowchart of the fabrication method of a basic polyelectrolyte film of blended polyvinyl alcohol and quaternary amine according to the present invention.

Refer to FIG. 4. Firstly, PVA weighing exactly 5.0 g is added into a reactor having 30 ml of DMSO, and after the entire reactor is airtightly enclosed, the dissolution reaction is undertaken at the temperature below 60° C. for 1 hour so that PVA can dissolve completely (Step S411); meanwhile, TEAC weighing 0.1~1.0 g is added into another reactor having 30 ml of DMSO, and similarly, after the entire reactor is airtightly enclosed, the dissolution reaction is undertaken at the temperature below 60° C. for 1 hour so that TEAC can dissolve completely (Step S412); next, the PVA-containing solution obtained in Step S411 and the TEAC-containing solution obtained in Step S412 are mixed to undertake a polymeric blending reaction at the temperature of 50~70° C. for less than 30 minutes (Step S42); next, according to the film thickness needed, appropriate amount (about 5~10 g) of well-blended polymeric solution is poured into a culture dish (about 10 cm in diameter), or appropriate amount of well-blended polymeric solution is applied onto a glass plate, and then, the culture dish or the glass plate with the polymeric solution is placed in a thermohydrostat and baked at the temperature of 60° C. and under the humidity of 30 RH % for 12 hours in order to dry the polar organic solvent (i.e. DMSO) out from the polymeric solution, and when DMSO has completely vaporized off, the culture dish or the glass plate is taken out from the thermohydrostat and cooled at the ambient temperature for 30 minutes to achieve thermal equilibrium, and then, the filmed polymer can be stripped off from the culture dish or the glass plate easily, and then, the polymeric film is weighed for the first time (Step S43); next, the polymeric film is entirely soaked in the aqueous solution containing 32 wt. % of potassium hydroxide (KOH) for 12~48 hours (Step S44); lastly, the KOH solution-containing polymer electrolyte film is taken out from the KOH solution, and dust-free papers are used to absorb the residual solution on the surface thereof, and then, the polymer electrolyte film is weighed again. Finally, the basic polymer electrolyte film of the present invention is thus completed (Step S45).

Further, nanometric, submicron, or micron powder/particles, such as hydrophilic silicon dioxide, titanium dioxide, zirconium dioxide and various ceramic oxides, may be selectively used in the abovementioned fabrication method in order to improve the film structure and promote the mechanic strength and electrical properties. Otherwise, the well-blended polymeric solution may be filmed on a substrate of a network film, such as glass-fiber cloth, PP/PE porous fibers, Nylon porous films, and PTFE networks, in order to enhance the mechanical strength of the polymer electrolyte film. Furthermore, in order to promote the chemical stability, about 0~20 wt. % (of the total weight) of anti-oxidant, such as hexamethylenetetramine, di-beta-naphthyl-para-naphthylamine, phenyl-beta-naphthylamine, phosphor-based anti-oxidant and phenol-based anti-oxidant, may also be added into the polyelectrolyte film, and from experiments, it is known that 0.1~10 wt. % of anti-oxidant has the best effect.

Figure 5:
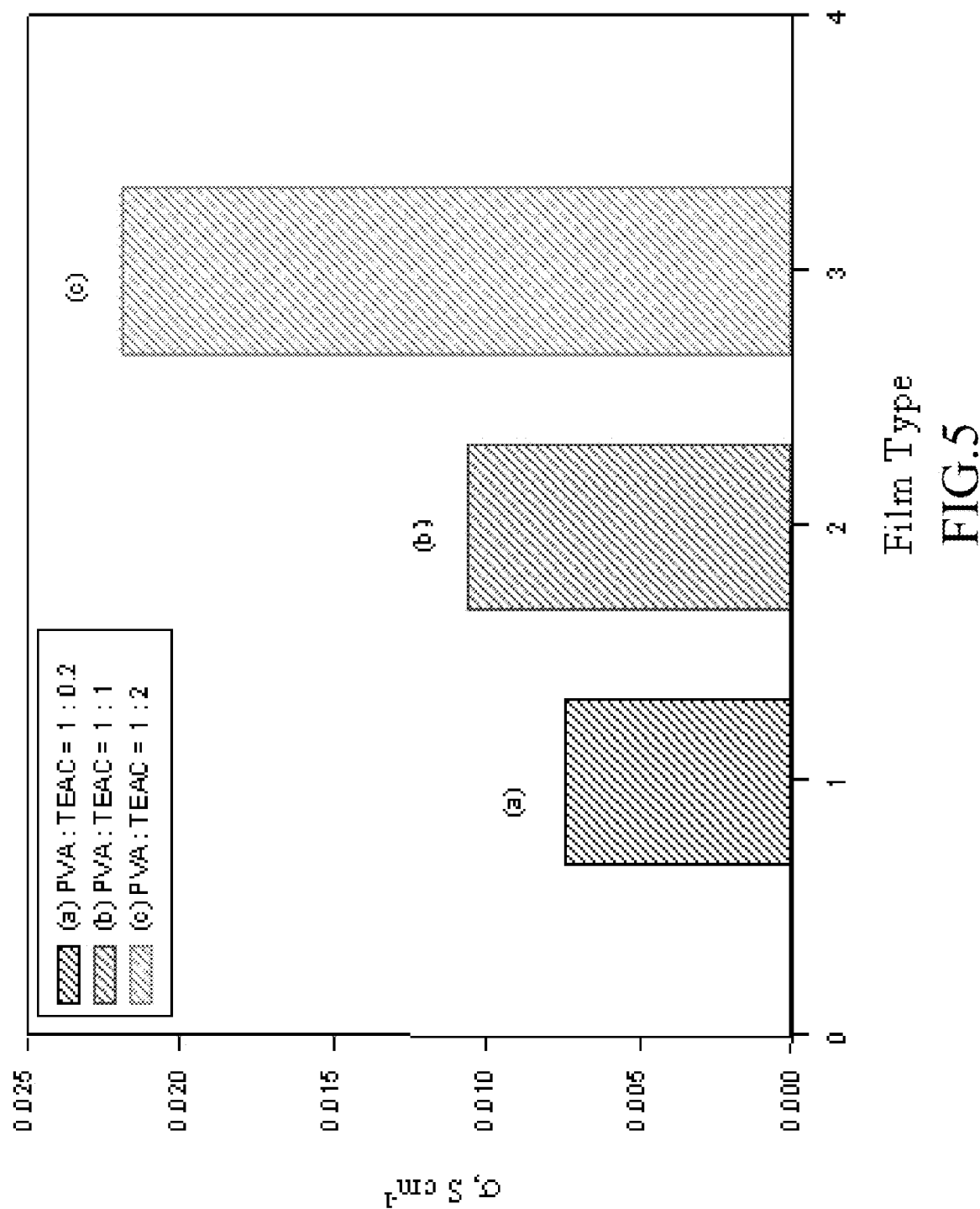
FIG. 5 is a diagram showing the relationship between the ionic conductivity and the blending ratio of polyvinyl alcohol and quaternary amine of the basic polymer electrolyte film of the present invention.

The fabrication method of a basic polymer electrolyte film of the present invention has been fully disclosed above, and the electrical properties of the polymer electrolyte film of the present invention are to be described below. Firstly, the relationship between the blending ratio and the ionic conductivity of the film is to be discussed. Refer to FIG. 5 a column chart showing the relationship between the blending ratio and the ionic conductivity of the film, wherein PVA and TEAC respectively having PVA/TEAC ratios of 1:0.2, 1:1, 1:2 are processed with the abovementioned film-forming steps and electrolyte-absorbing steps to obtain the polymer electrolyte films of three different blending ratios. A digital thickness detector is used to measure the thickness thereof. The measurement of ionic conductivity is implemented with AUTO-LAB FRA an electrochemical impedance analyzer having stainless steel electrodes, wherein the measurement of the ionic conductivity of the polymer electrolyte film is performed with the bi-electrode method with the scanning frequency of 100 kHz-1 Hz and the amplitude of 10 mV, and then, the ionic conductivity is worked out by the following equation of ionic conductivity ($\sigma$):

$$\sigma = l/(R_b \times A) \qquad [1]$$

wherein $\sigma$ is the ionic conductivity in S/cm;

l is the film thickness in cm;

$R_b$ is the AC resistance in ohm; and

A is the electrode area in cm$^2$, and in the present invention, the electrode area is fixed in 0.785 cm$^2$.

From the measurement result of the film ionic conductivity, it can be seen that the higher the TEAC proportion, the greater the ionic conductivity of the polymer electrolyte film. $R_b$ is a temperature-dependent parameter, and the relationship among temperature, blending ratio, and film conductivity is shown in Table.1. It can be seen that for a given blending ratio, the film conductivity is proportional to the temperature in the range of 30~70° C., i.e. for a given blending ratio, the film conductivity rises with the rising temperature. However, when PVA/TEAC ratio shifts from 1:0.2 to 1:1 and 1:2, the temperature dependence of film conductivity decreases, i.e. the greater the TEAC proportion, the less the temperature dependence of film conductivity. From Table.1, it is also seen that for a give temperature, the greater the TEAC proportion, the higher the film conductivity, wherein the conductivity increment for the blending ratio shift of from 1:1 to 1:2 is much more obvious in contrast to that of from 1:0.2 to 1:1. Concluded from FIG. 5 and Table.1, it is known that TEAC can really promote the ionic conductivity of the polymer electrolyte film. Therefore, it can be rationally inferred that the polymer electrolyte film blended with appropriate amount of TEAC has very stable molecular structure so that the polymer electrolyte film can have superior thermal stability and super ionic conductivity at high temperature.

TABLE 1

| T (° C.)\σ (S/cm) | PVA/TEAC ratio | | |
| --- | --- | --- | --- |
|  | 1:0.2 | 1:1 | 1:2 |
| 30 | 0.0106 | 0.0219 | 0.0459 |
| 40 | 0.0138 | 0.0223 | 0.0462 |
| 50 | 0.0164 | 0.0233 | 0.0464 |
| 60 | 0.0201 | 0.0248 | 0.0480 |
| 70 | 0.0224 | 0.0254 | 0.0497 |

The ionic conductivity provided by the abovementioned equation [1] can be used to derive the activation energy via the Arrhenius relation:

$$\sigma = \sigma_0 \exp(-E_a/RT) \qquad [2],$$

or $$\log \sigma = \log \sigma_0 - 2.303 \times E_a/1000R \times 1/T \qquad [3],$$

wherein $\sigma$ is the electrical conductivity in S/cm;

$\sigma_0$ is a pre-exponential factor;

$E_a$ is the activation energy in kJ/mole, and it often ranges from 5 to 20 kJ/mole;

R is the universal gas constant in J/mole×K; and

T is the temperature in K.

From the abovementioned equation [3], it is known that the activation energy is the slope of the curve with log $\sigma$ plotted against 1/T.

Figure 6:
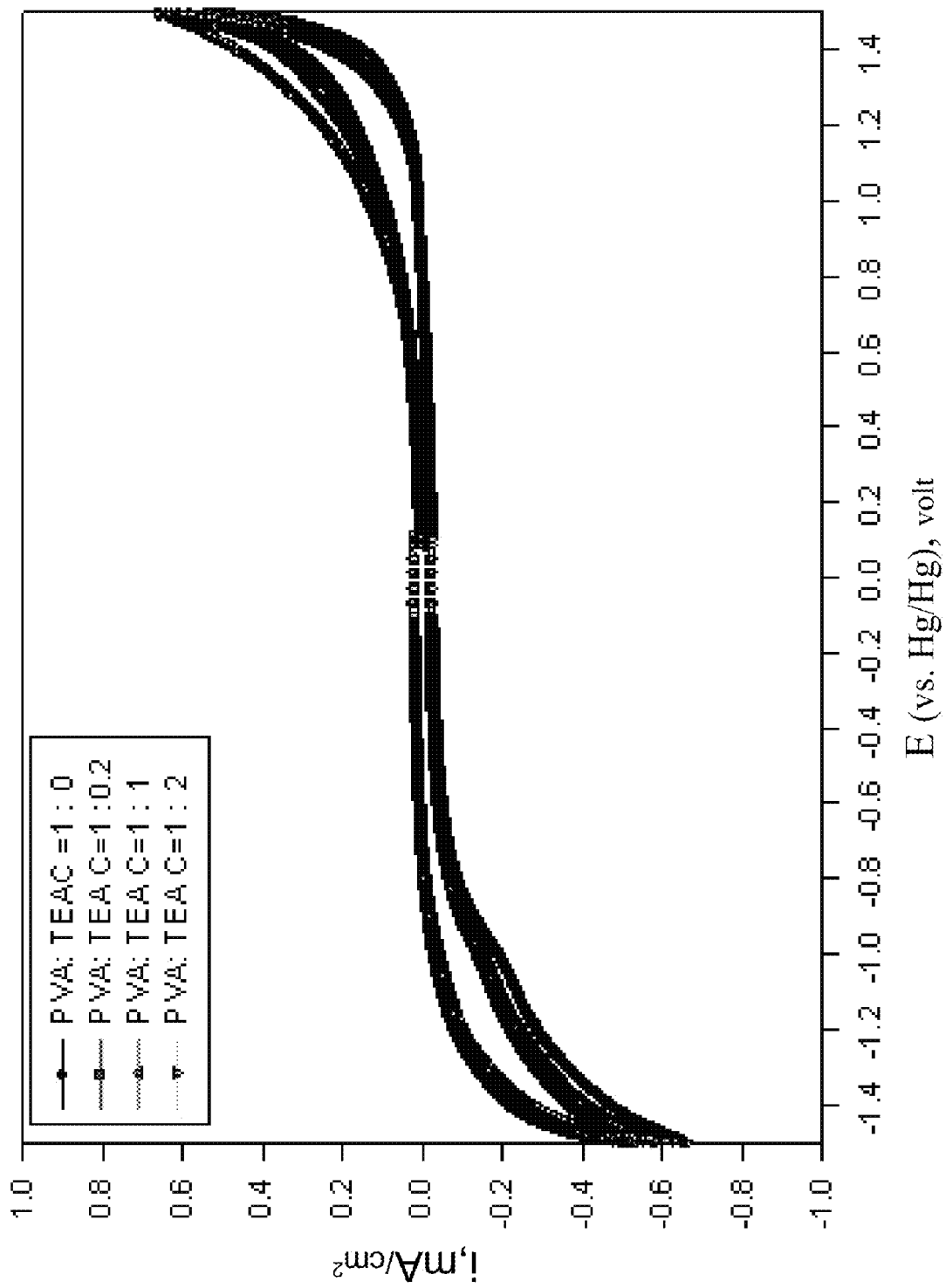
FIG. 6 is a diagram showing the results of the cyclic voltammetric tests in different PVA/quaternary amine ratios for the basic polymer electrolyte films of blended polyvinyl alcohol and quaternary amine according to the present invention.

Next, the electrochemical stability of the polymer electrolyte film of the present invention is to be discussed below. Refer to FIG. 6 for the results of the cyclic voltammetric tests for the polymer electrolyte films of different PVA/TEAC ratios. The cyclic voltammetric test is implemented with AUTOLAB GPES a stainless-steel-electrode electrochemical impedance analyzer, wherein the polymer electrolyte films of different PVA/TEAC ratios is scanned with two electrodes at the speed of 1 mV/s within the range of −1.5v~1.5V. It is found that within the scanning voltage range, there is none Faraday current appearing no matter which PVA/TEAC ratio of 1:0, 1:0.2, 1:1, and 1:2 the polymer electrolyte film has, and it means that neither oxidation nor reduction occurs; therefore, it is known that although a given proportion of TEAC is blended with PVA, the PVA-containing polymer electrolyte film still has superior electrochemical stability within the voltage range of −1.5V~1.5V.

Figure 7:
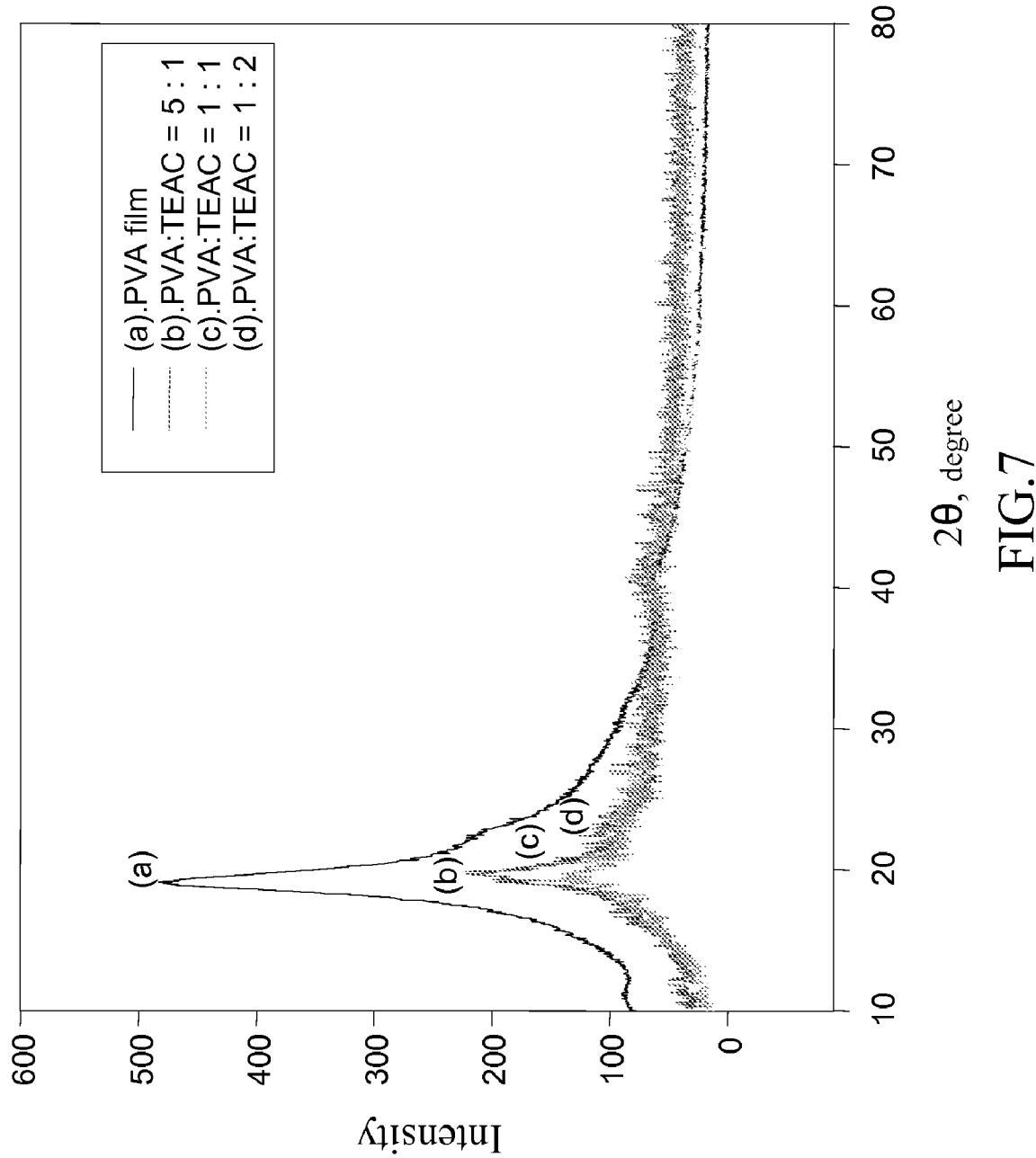
FIG. 7 is a diagram showing the results of the X-ray diffraction analysis in different PVA/quaternary amine ratios for the basic polymer electrolyte films of blended polyvinyl alcohol and quaternary amine according to the present invention.

Next, the ionic conductivity and ionic transport number at the ambient temperature are to be discussed below. Refer to FIG. 7 for the results of the X-ray diffraction analysis for the polyelectrolyte films of different PVA/TEAC ratios. Curve (a) is the analysis result of the polymer electrolyte film of PVA/TEAC ratio of 1:0, and it has an obvious crystalline peak when 2θ=20°. Curves (b), (c), (d) are respectively the analysis results of the polymer electrolyte films of PVA/TEAC ratios of 1:0.2, 1:1, 1:2. From those curves, it can be observed that the peak intensity at 20° of 2θ is greatly reduced to half the original intensity when PVA/TEAC ratio changes from 1:0 to 1:0.2, and with the increase of TEAC, the peak intensity continues to decrease gradually. From the crystallinity analysis implemented with an X-ray diffractometer, it is known that TEAC can destroy the crystalline structure of PVA during the blending reaction, and PVA blended with TEAC has lower crystallinity, which can reduce the barrier of ion movement inside the polymeric structure, and thereby, the ionic conductivity and the ion transport number can be greatly promoted.

Figure 8A:
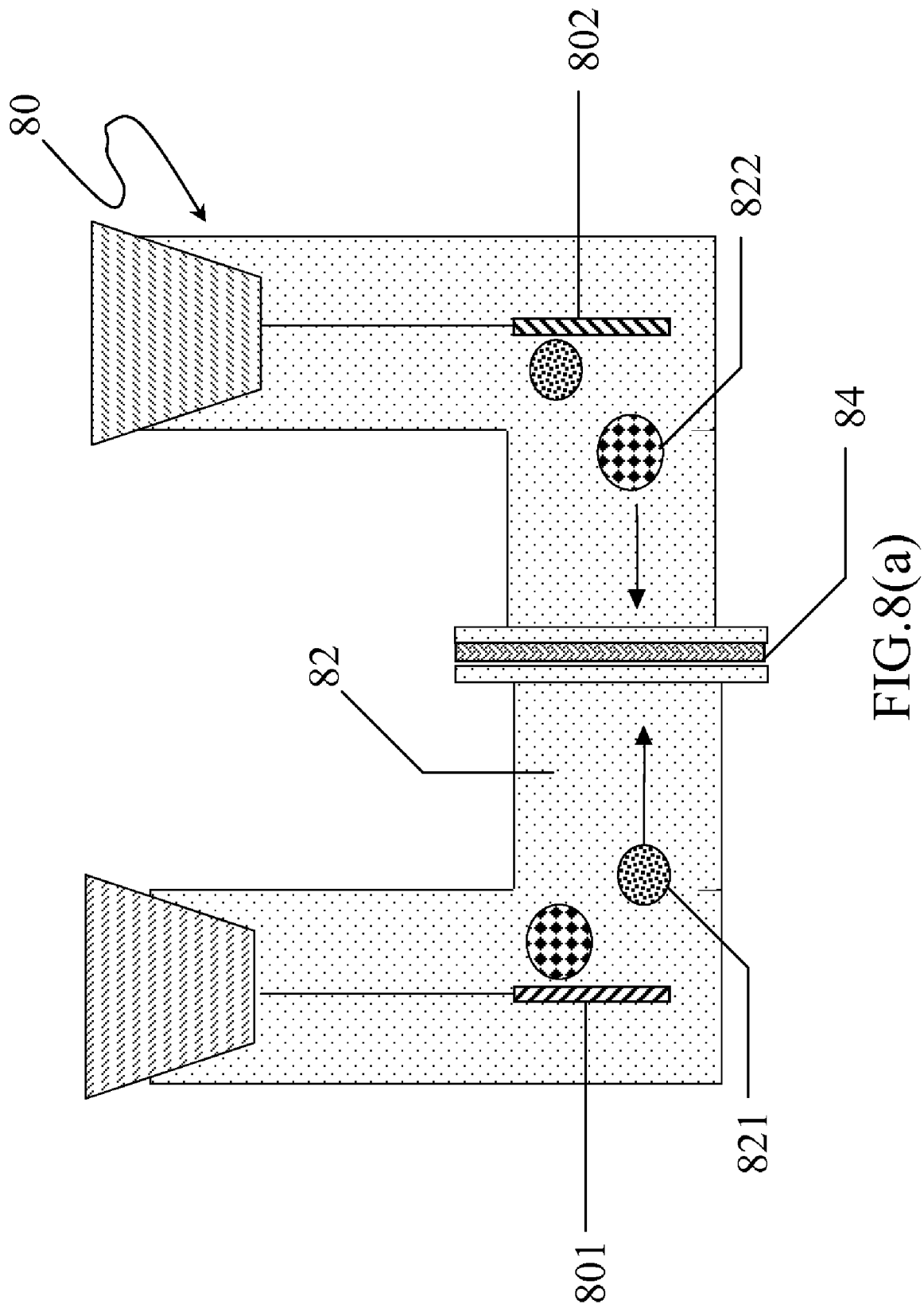
FIG. 8(a) is a diagram schematically showing Hittorf's method.
Figure 8B:
FIG. 8(b) is a diagram showing the practical equipment of Hittorf's method used in the experiment of the present invention.

Hittorf's method is used to measure the abovementioned ion transport number, and it will be further described in detail here. The ion transport numbers of the polymer electrolyte films of different PVA/TEAC ratios and soaked in different alkali hydroxides are also provided herein. Refer to FIG. 8(a) for a schematic diagram of Hittorf's method. A platinum anode 801 and a platinum cathode 802 are installed in an electrolysis bath 80, which contains a potassium-hydroxide aqueous solution 82, and a test polymer electrolyte film 84 is clipped to between the anode and the cathode. When a given current (not shown in the drawing) flows through the electrolysis bath 80, owing to the electrical potential difference between the anode and the cathode, potassium ions 821 and hydroxide ions 822 will move along the directions indicated by the arrows and respectively toward the platinum cathode 802 and the platinum anode 801. The transport numbers of the positive ion and the negative ion are calculated from the quantities of the electrochemical products on the anode and the cathode. Also refer to FIG. 8(b) for the practical equipment of Hittorf's method used in this experiment. Refer to Table.2 for the result of the measurement implemented with the abovementioned Hittorf's method and the equipment thereof. The alkali hydroxide electrolytes used herein include: NaOH, KOH, and LiOH. Similar to the abovementioned embodiments, the polymer electrolyte films used herein are also of those four kinds of PVA/TEAC ratios of 1:0, 1:0.2, 1:1, 1:2. No matter which blending ratio the polymer electrolyte films have, the KOH-containing polymer electrolyte films always have the highest ionic transport number; the NaOH-containing film and the LiOH-containing film respectively have the second highest and the lowest ion transport numbers. For a given alkali-hydroxide electrolyte, the greater the TEAC proportion, the higher the ion transport number.

Figure 10:
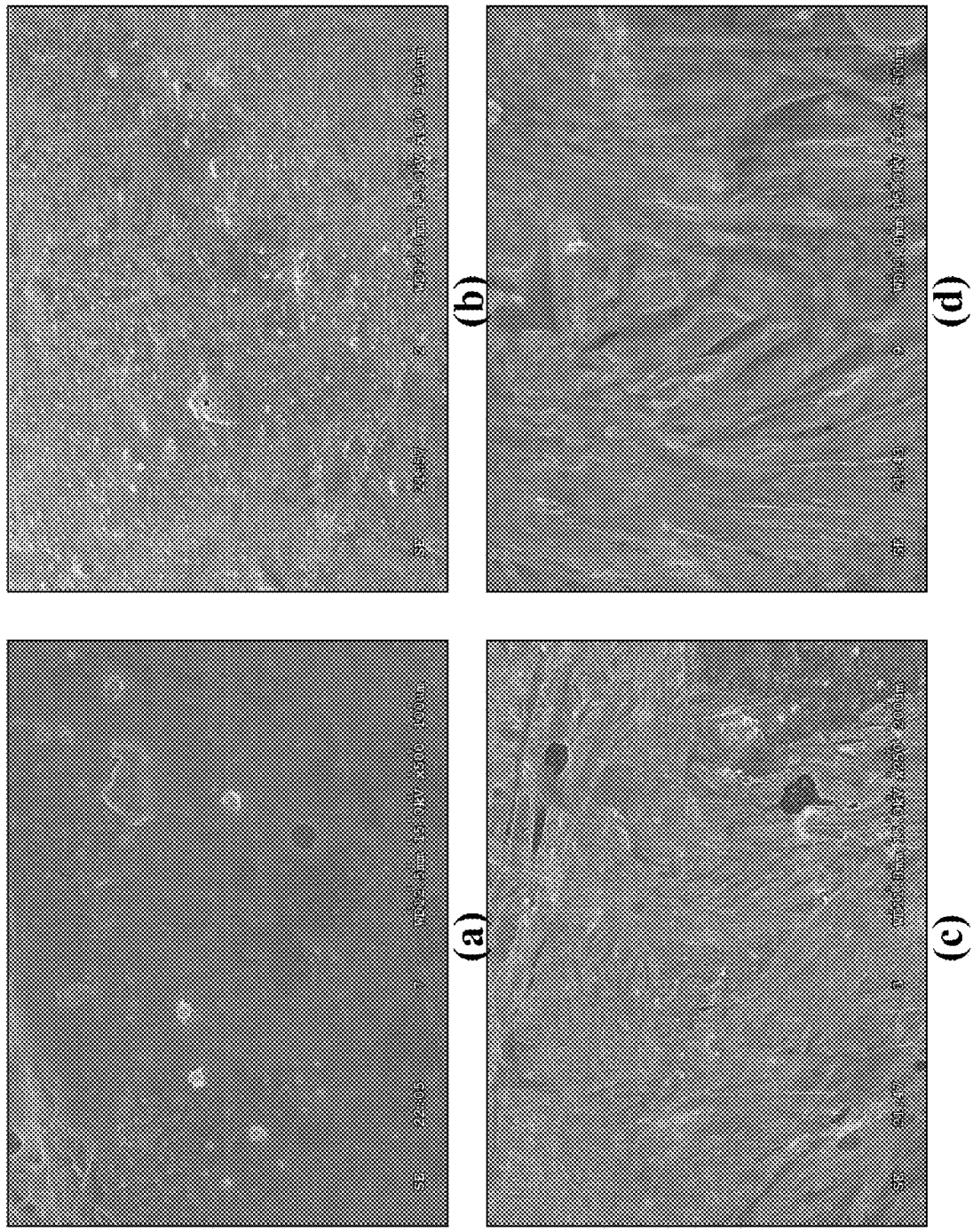
FIG. 10(a) is a diagram showing a 500×SEM microscopic surface morphology of the basic polymer electrolyte film of 1:0 PVA/quaternary amine ratio according to the present invention.
FIG. 10(b) is a diagram showing a 100×SEM microscopic surface morphology of the basic polymer electrolyte film of 1:0.2 PVA/quaternary amine ratio according to the present invention.
FIG. 10(c) is a diagram showing a 250×SEM microscopic surface morphology of the basic polymer electrolyte film of 1:1 PVA/quaternary-amine ratio according to the present invention.
FIG. 10(d) is a diagram showing a 250×SEM microscopic surface morphology of the basic polymer electrolyte film of 1:2 PVA/quaternary amine ratio according to the present invention.

The tensile strength of the polymer electrolyte film of the present invention has been described above, and the surface morphology characteristics of the film of the present invention are to be described below in cooperation with four SEM (scanning electronic microscopy) photographs. Please respectively refer to FIG. 10 (a), FIG. 10 (b), FIG. 10(c), and FIG. 10(d) for the surface morphology of the polymer electrolyte films of PVA/TEAC ratios of 1:0, 1:0.2, 1:1, 1:2, wherein the magnifications of FIG. 10 (a), FIG. 10(b), FIG. 10 (c), and FIG. 10(d) are respectively 500×, 100×, 250×, and 250×. As shown in FIG. 10 (a), the polymer electrolyte film of 1:0 PVA/TEAC ratio has very smooth surface. As shown in FIG. 10 (b), the surface of the polymer electrolyte film of 1:0.2 PVA/TEAC ratio has some observable fibrous texture. As shown in FIG. 10 (c), the surface of the polyelectrolyte film of 1:1 PVA/TEAC ratio has more obvious radiant fibrous texture in comparison with the film in FIG. 10 (b). The blending reaction between PVA and TEAC will form polymeric molecules having side chains; therefore, the higher the TEAC ratio, the more obvious the fibrous texture. The polymer elec-

TABLE 2

| Alkali-hydroxide electrolyte | PVA:TEAC = 1:0 | PVA:TEAC = 1:0.2 | PVA:TEAC = 1:1 | PVA:TEAC = 1:2 |
| --- | --- | --- | --- | --- |
| NaOH | 0.86 | 0.91 | 0.95 | 0.96 |
| KOH | 0.93 | 0.96 | 0.99 | 0.99 |
| LiOH | 0.82 | 0.87 | 0.92 | 0.93 |

Figure 9:
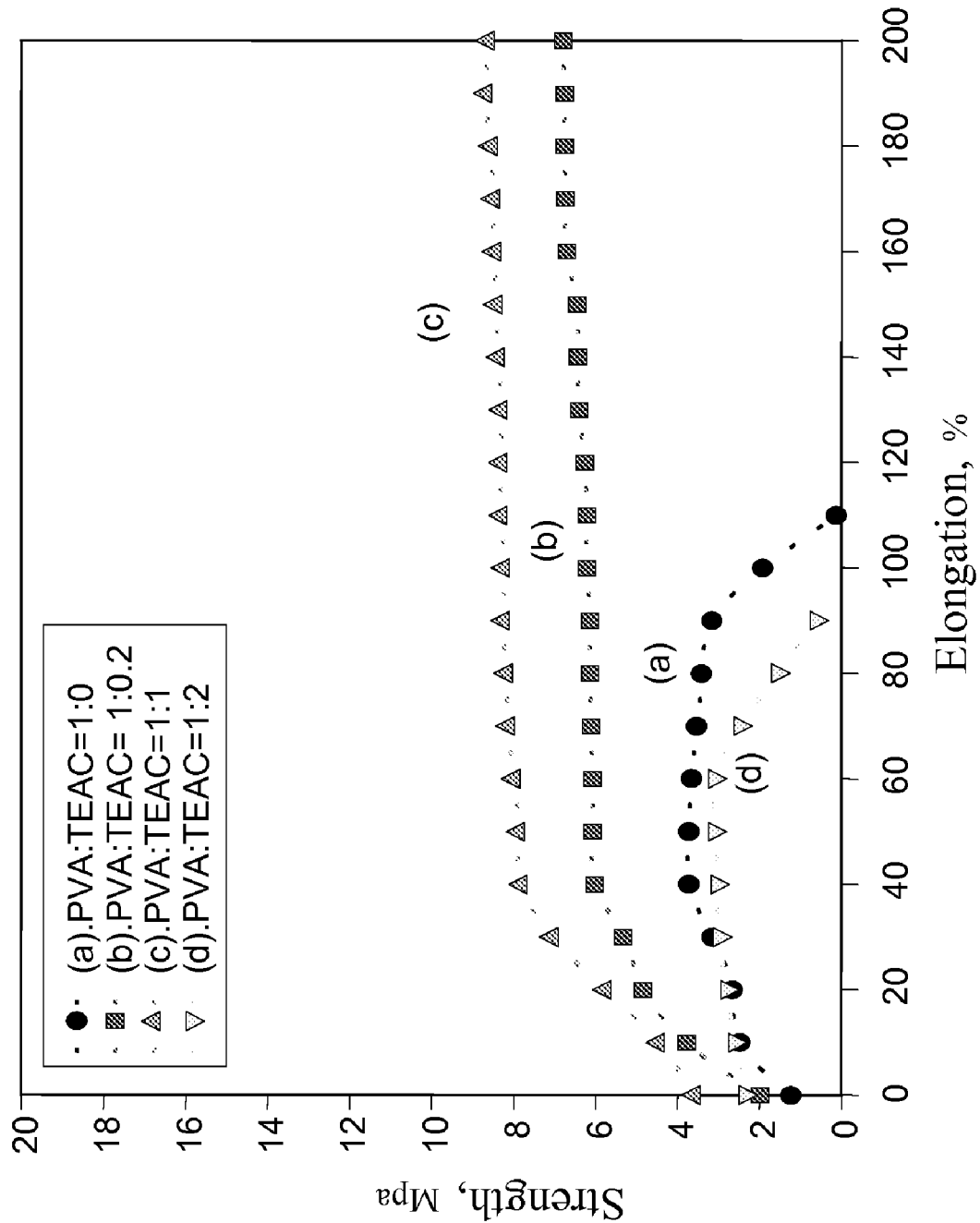
FIG. 9 is a diagram showing the stress-strain relationship obtained in a tensile strength test in different PVA/quaternary amine ratios for the basic polymer electrolyte films of blended polyvinyl alcohol and quaternary amine according to the present invention.

The electrochemical properties of the polymer electrolyte film of the present invention have been described above, and the physical properties of the film of the present invention are to be discussed below. Refer to FIG. 9 for the stress-strain relationship obtained in a tensile test for the polymer electrolyte film of the present invention. The tensile strength test is an ASTM (American Society for Testing and Materials) standard tensile test for film materials and is used to prove the industrial availability of the polymer electrolyte film of the present invention. In FIG. 9, there are four curves (a), (b), (c), and (d) respectively presenting the results of the tensile tests for the polymer electrolyte films of PVA/TEAC ratios of 1:0, 1:0.2, 1:1, 1:2. From FIG. 9, it is clearly seen that the polymer electrolyte films of PVA/TEAC-ratios of 1:0.2 and 1:1 have higher tensile strength than the polymer electrolyte film without any TEAC blended therein, and as shown in Table.3, the tensile strength can be even as high as 8.83 Mpa. However, when PVA/TEAC ratio reaches 1:2, the tensile strength rapidly falls to 3.13 Mpa, which is almost the same as the polymer electrolyte film without any TEAC blended therein. The reason why the tensile strength is reduced obviously may be that too much TEAC segregates the backbones of PVA and loosens the structure.

trolyte film of 1:2 PVA/TEAC ratio has the highest proportion of TEAC and has the most radiant fibrous texture, as shown in FIG. 10 (d).

So far, the fabrication method, the electrochemical properties, and the physical properties of the polymer electrolyte film of the present invention have been clearly described in the preceding sections, and now, the application of the polymer electrolyte film of the present invention to practical electrochemical energy storage systems is to be discussed below. Herein, the zinc-air battery is used to exemplify the application of the present invention. 3 grams of zinc gel, which contains 60 wt. % of zinc powders, is used as the negative electrode of the battery, and an air electrode formed by carbon powder is used as the positive electrode of the battery, and one of the polymer electrolyte films of different PVA/TEAC ratios is used as the electrolyte film of the battery and is interposed between the zinc negative electrode and the air-carbon positive electrode, and a casing 3 cm wide and 2 cm long contains the abovementioned elements to form a zinc-air battery having an area 6 cm square. In the zinc-air battery, zinc is an active material for providing capacitance; in theorem, each gram of zinc can provide 820 mAh of capacitance; thus, the overall battery can provide 1,470 mAh of capacitance theo-

TABLE 3

Figure 11:
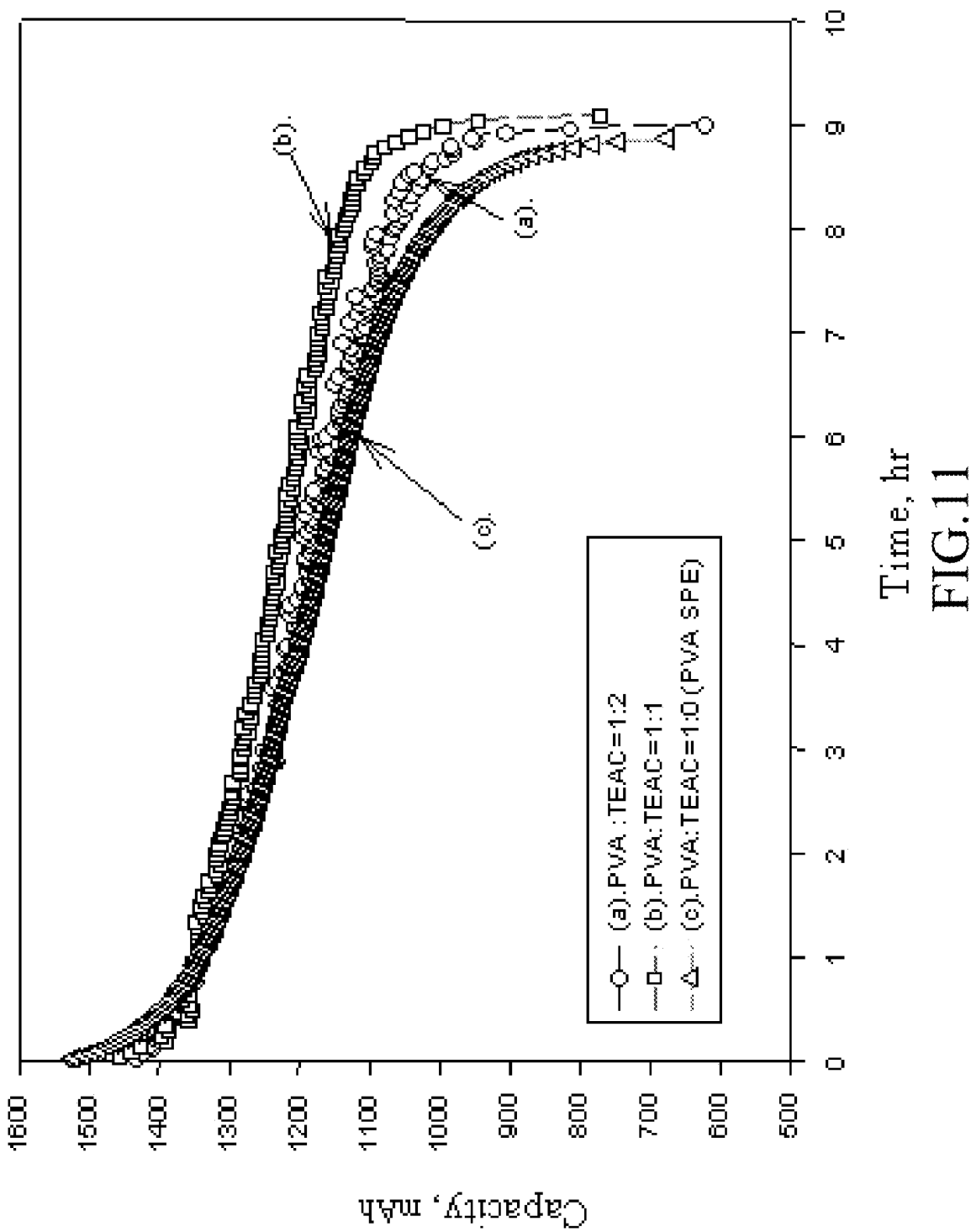
FIG. 11 is a diagram showing the results of the discharge tests at the discharge rate of C/10 for the zinc-air batteries using the basic polymer electrolyte films of blended PVA/quaternary amine according to the present invention.
Figure 12:
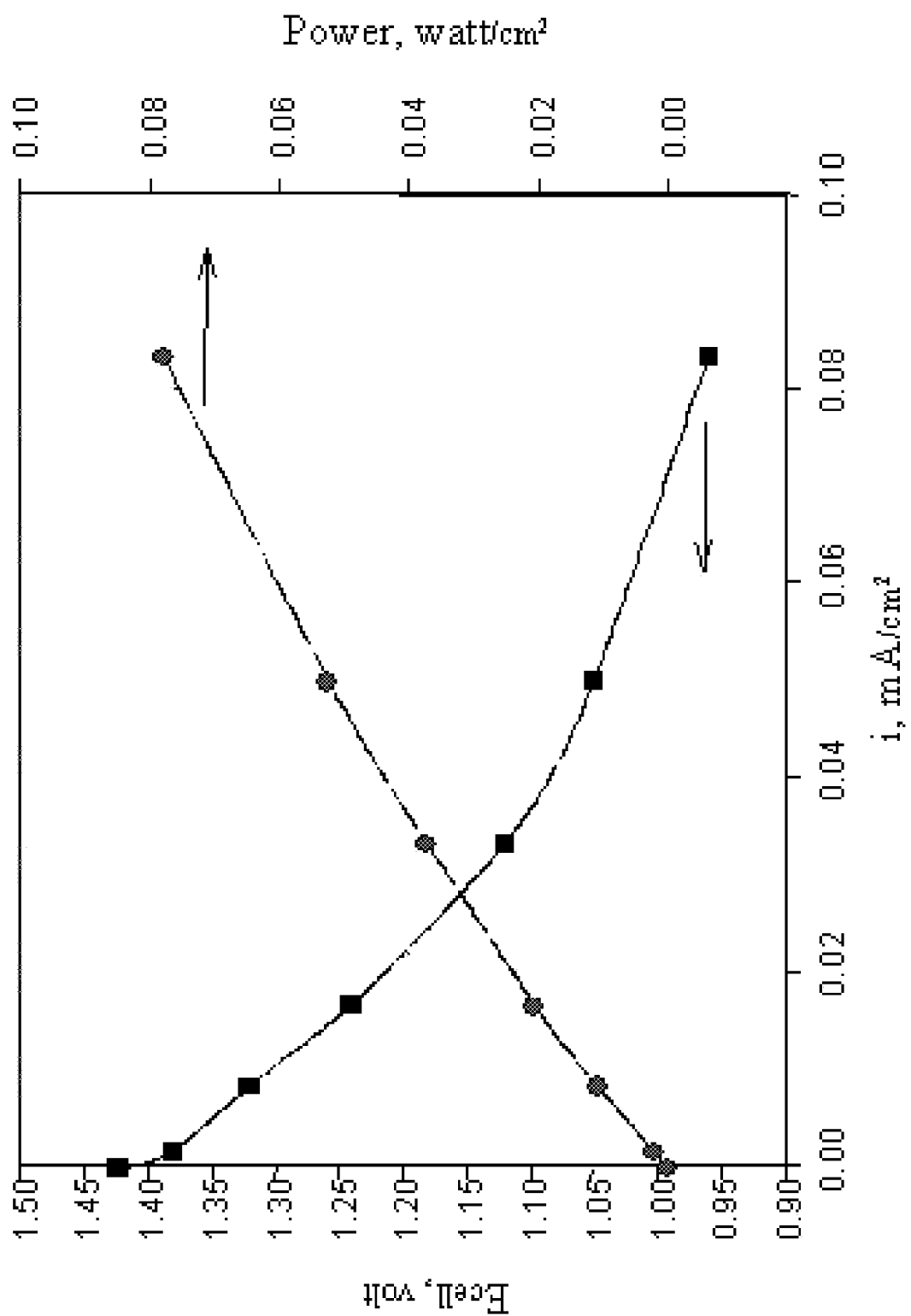
FIG. 12 is a diagram showing the discharge power of the zinc-air battery using the basic polyelectrolyte films of blended PVA/quaternary amine according to the present invention.

| | Composition | | | |
| --- | --- | --- | --- | --- |
| Property | PVA:TEAC = 1:0 | PVA:TEAC = 1:0.2 | PVA:TEAC = 1:1 | PVA:TEAC = 1:2 |
| Thickness (mm) | 0.160 | 0.160 | 0.160 | 0.160 |
| Width (mm) | 10 | 10 | 10 | 10 |
| Load (kg) | 0.6 | 1.1 | 1.4 | 0.5 |
| Tensile strength (MPa) | 3.75 | 6.64 | 8.83 | 3.13 |
| Elongation (%) | 98.1 | 404.7 | 442.8 | 86.0 | retically. In this discharge test, the battery is discharged at the ambient temperature of 25° C. and at the rate of 150 mA, i.e. about one tenth of the numeral of the battery capacitance. The conditions of the discharge test and the results thereof are shown in Table.4. The zinc-air battery using the polymer electrolyte film of 1:1 PVA/TEAC ratio has the highest capacitance utilization rate amounting to about 93.1%. The zinc-air batteries using the polymer electrolyte films of 1:0 and 1:2 PVA/TEAC ratios have the capacitance utilization rate of about 90.3%. Also refer to FIG. 11 for the discharge curves obtained in the test. Curves (a), (b), (c) are respectively the discharge curves of the batteries using the polymer electrolyte films of PVA/TEAC ratios of 1:2, 1:1, 1:0. Curve (b) has the smallest slope and the longest discharge platform and thus has the best discharge performance, and it means that at the 1:1 PVA/TEAC ratio, the polyelectrolyte film can obtain superior ionic conductivity, ionic transport number, chemical stability and mechanical strength, wherein the internal impedance is reduced, and the active material can stably work at its best efficiency. Curves (a) and (c) have similar discharge performance; however, from FIG. 11, it can be found the zinc-air battery using the polymer electrolyte films containing blended TEAC has a smaller slope and a longer discharge platform, and it means that the polymer electrolyte films containing blended TEAC have better electrochemical and physical properties. Refer to FIG. 12 for the discharge power curve of the zinc-air battery using the polymer electrolyte films of the present invention, and it can be seen that when the zinc-air battery discharges from about 1.40~1.45 V to about 0.95 V, the discharge power density can reach more than 80 mW/cm$^2$.

TABLE 4

| Test item | Blending ratio | | |
|---|---|---|---|
| | PVA:TEAC = 1:0 | PVA:TEAC = 1:1 | PVA:TEAC = 1:2 |
| Theoretical capacitance (mAh) | 1,470 | 1,470 | 1,470 |
| Discharge current (mA) | 150 | 150 | 150 |
| Discharge duration (hr) | 8.8 | 9.11 | 9.0 |
| Real capacitance (mAh) | 1,328 | 1,368 | 1,328 |
| Utilization rate (%) | 88 | 92 | 91 |

The preferred embodiments of the present invention have been provided above, and the physical and chemical properties of the film fabricated according to the method provided by the preferred embodiments have also been described above. In summary, the present invention proposes a fabrication method of a basic polymer electrolyte film of blended polyvinyl alcohol and quaternary amine, can change the crystallinity, of the polymeric PVA molecules and promote the ionic conductivity, the mechanical strength, the chemical stability, and the hydrophile of the basic polymer electrolyte film made of blended polyvinyl alcohol and quaternary amine, the polymer electrolyte film of the present invention has better deterioration film resistance and can absorb more alkali electrolyte solution. According to the zinc-air battery tests, the basic polymer electrolyte film of blended polyvinyl alcohol and quaternary amine of the present invention can also be extensively used in common electrochemical energy storage systems, such as Ni—H batteries, Ni—Cd batteries, Ni—Zn batteries, Ag—Zn batteries, fuel batteries, metal-air batteries, primary/secondary alkaline (Zn/MnO$_2$) batteries, and capacitors; thereby, the conversion efficiency between chemical energy and electrical energy is greatly promoted, and then, energy can be efficiently utilized. PVA has been used by industries for a long time without serious environmental problems; meanwhile, its price is reasonable, and its supply is pretty stable; therefore, PVA is an ideal material of energy industries. The fabrication method of a basic polymer electrolyte film of blended polyvinyl alcohol and quaternary amine proposed by the present invention not only can effectively reduce the fabrication cost, but also can provide a polymer electrolyte film of better stability, superior electrochemical properties, and higher mechanical strength to solve the problems occurring in the conventional technologies.

Those embodiments described above are to clarify the present invention in order to enable the persons skilled in the art to understand, make and use the present invention; however, it is not intended to limit the scope of the present invention, and any equivalent modification and variation according to the spirit of the present invention is to be included within the scope of the claims stated below.

What is claimed is:

1. A method of producing a basic polyelectrolyte film of blended polyvinyl alcohol (PVA) and quaternary amine, comprising the following steps:
    obtaining a polar organic solvent, and separating it into two reaction vessels;
    adding a polyvinyl alcohol into said polar organic solvent contained in one of said two reaction vessels, and allowing said polyvinyl alcohol to completely dissolve in said polar organic solvent in order to form a PVA-containing reactant solution;
    adding a quaternary amine into said polar organic solvent contained in the other of said two reaction vessels, and allowing said quaternary amine to completely dissolve in said polar organic solvent in order to form a quaternary amine-containing reactant solution;
    mixing said PVA-containing reactant solution and said quaternary amine-containing reactant solution to initiate a polymeric blending reaction and form a solution of the product of said polymeric blending reaction;
    pouring said solution of the product of said polymeric blending reaction onto a tray, and allowing said polar organic solvent to vaporize completely in order to form a polymeric film; and
    stripping off said polymeric film from said tray, and soaking said polymeric film in an alkali-hydroxide solution to obtain said basic polymer electrolyte film of blended polyvinyl alcohol and quaternary amine.

2. The method according to claim 1, wherein said step of forming said PVA-containing reactant solution includes a temperature range of 40 to 90° C., and a duration range of 40 to 120 minutes.

3. The method according to claim 1, wherein said step of forming said quaternary amine-containing reactant solution includes a temperature range of 30 to 80° C., and a duration range of 30 to 100 minutes.

4. The method according to claim 1, wherein said step of forming said solution of the product of said polymeric blending reaction includes a blending agitation speed range of 300 to 2,000 rpm.

5. The method according to claim 1, wherein said step of forming said solution of the product of said polymeric blending reaction includes a temperature range of 30 to 90° C., and a duration range of 10 to 20 minutes.

6. The method according to claim 1, wherein said step of allowing said polar organic solvent to vaporize completely includes a temperature range of 40 to 70° C., and a duration range of 30 to 1,800 minutes.

7. The method according to claim 1, wherein said step of allowing said polar organic solvent to vaporize completely, includes a humidity range of 5 to 50 RH %.

8. The method according to claim 1, wherein said polyvinyl alcohol is at least 80% saponified.

9. The method according to claim 1, wherein said quaternary amine is selected from the group consisting of 1,4-diazabicycle [2.2.2] octane, triethyl amine, and tetraethyl amine.

10. The method according to claim 1, wherein said polar organic solvent is selected from the group consisting of dimethyl sulfoxide, dimethyl formamide, tetrahydrofuran, methyl ethyl ketone, acetone, methanol and isopropyl alcohol.

11. The method according to claim 1, wherein said polar organic solvent is dimethyl sulfoxide, having weight ranges from 10 to 90 wt. % in the PVA-containing and quaternary amine-containing reactant solutions.

12. The method according to claim 1, wherein said tray is a culture dish or a glass plate or a polytetrafluoroethylene plate.

13. The method according to claim 1, wherein said alkali-hydroxide solution is selected from the group consisting of potassium hydroxide solution, sodium hydroxide solution and lithium hydroxide solution.

14. The method according to claim 1, wherein said alkali-hydroxide solution is an amine hydroxide and is selected from the group consisting of quaternary amine hydroxide solution, tertiary amine hydroxide solution, and tetramethyl ammonium hydroxide solution.

15. The method according to claim 1, wherein said basic polymer electrolyte film of blended polyvinyl alcohol and quaternary amine is formed on a substrate of a network polymeric film.

16. The method according to claim 15, wherein said network polymeric film is selected from the group consisting of glass-fiber cloth, Nylon porous film, and polytetrafluoroethylene network.

17. The method according to claim 15, wherein the thickness of said network polymeric film ranges from 5 to 5,000 μm.

18. The method according to claim 1, wherein said basic polymer electrolyte film of blended polyvinyl alcohol and quaternary amine is used as an electrolyte film in energy storage systems, including: Ni—H batteries, Ni—Cd batteries, Ni—Zn batteries, Ag—Zn batteries, fuel batteries, metal-air batteries, alkaline ($Zn/MnO_2$) batteries, and capacitors.

* * * * *